United States Patent
Stenta

(10) Patent No.: US 8,478,237 B1
(45) Date of Patent: Jul. 2, 2013

(54) DUAL-MODE VEHICLE MOBILE PHONE DISABLER

(76) Inventor: Robert Stenta, Cicero, IL (US)

( * ) Notice: Subject to any disclaimer, the term of this patent is extended or adjusted under 35 U.S.C. 154(b) by 0 days.

(21) Appl. No.: 13/285,163

(22) Filed: Oct. 31, 2011

Related U.S. Application Data

(60) Provisional application No. 61/416,504, filed on Nov. 23, 2010.

(51) Int. Cl.
*H04M 1/66* (2006.01)
*H04M 1/68* (2006.01)
*H04M 3/16* (2006.01)

(52) U.S. Cl.
USPC .......................................... 455/410; 340/438

(58) Field of Classification Search
USPC ........... 455/410–411, 414.1, 419–420, 550.1, 455/552.1, 556.1–557, 569.1–569.2, 575.9; 340/425.5–426.36, 438, 439
See application file for complete search history.

(56) References Cited

U.S. PATENT DOCUMENTS

| 6,353,778 | B1 | 3/2002 | Brown |
| 6,690,940 | B1 | 2/2004 | Brown et al. |
| 6,771,946 | B1 | 8/2004 | Oyaski |
| 7,202,798 | B2 | 4/2007 | Harris |
| 7,236,776 | B2 | 6/2007 | Nath et al. |
| 2007/0001828 | A1 | 1/2007 | Martinez |
| 2012/0092148 | A1 * | 4/2012 | Santos .......................... 340/438 |

\* cited by examiner

*Primary Examiner* — Kashif Siddiqui
(74) *Attorney, Agent, or Firm* — Goldstein Law Offices, P.C.

(57) ABSTRACT

A system prevents operation of a land vehicle having an interior when a communication functionality of a mobile phone is in use within the interior. The system includes a power source and a dual-mode mobile phone disabler including a processor powered by the power source and an antenna operably connected to the processor. Before the vehicle is on, the antenna detects a communication signal from the mobile phone within the interior when the communication functionality including communication with a cell site is in use. In response, the processor prevents the vehicle from being turned on until the antenna detects no use of the communication functionality. The communication signal indicates use of the communication functionality. After the vehicle is on, the processor, via the antenna, periodically communicates with the mobile phone within the interior to keep disabled the communication functionality. When the vehicle is off, the antenna ceases to communicate.

15 Claims, 4 Drawing Sheets

DUAL-MODE VEHICLE MOBILE PHONE DISABLER

CROSS-REFERENCE TO RELATED APPLICATIONS

This application claims the benefit of U.S. Provisional Application No. 61/416,504, filed on Nov. 23, 2010, which is herein incorporated by reference in its entirety.

TECHNICAL FIELD

The present invention relates generally to mobile communication devices. More particularly, the present invention relates to a dual-mode vehicle mobile phone disabler.

BACKGROUND

Mobile phones are widely used for communication and entertainment. Mobile phone use while driving is common, but frequently dangerous. Due to the number of accidents that are related to mobile phone use while driving, some jurisdictions have made the use of a mobile phone while driving illegal. Others have enacted laws to ban handheld mobile phone use, but allow use of a headset. In some cases restrictions are only directed to minors or those who are newly qualified license holders.

Unfortunately though, penalties resulting from violation of such laws are relatively lax and do not serve as a sufficient deterrent. Also, inadequate law enforcement, partially resulting from a recent economic downturn and continuing terrorist threat, contributes to violations of such laws. Furthermore, when operating a vehicle, many individuals hide the mobile phone when a law enforcement officer is nearby and resume its use when the law enforcement officer is away.

To reduce the number of accidents that are related to mobile phone use while driving, some mobile phone makers have incorporated voice activated features into the mobile phones. However, the software enabling the voice activated features is inadequate. Also, the voice activated features often cause a vehicle operator, especially a new driver or a minor learning how to drive, to become distracted during vehicle operation. Moreover, new drivers or minors learning how to drive often do not have the skills required to operate a vehicle proficiently on top of the complexities of operating a mobile communication device.

Similarly, driving while using a headset is often not safer than using a mobile phone as the increased cognitive workload involved in holding a conversation, not the use of hands, causes the increased risk. Hence, many individuals still operate vehicles, while using a mobile phone, thus endangering themselves and others.

Although some methods of reducing mobile phone use within a vehicle have been developed, the methods suffer from various drawbacks. For example, some signal scrambling devices are somewhat helpful in reducing mobile calls during vehicle operation, but illegal according to the Federal Communications Commission (FCC). Also, signal scramblers are inadequate in effectively reducing the use of mobile phones for entertainment purposes, such as video games.

Accordingly, more efficient ways of dealing with at least the foregoing disadvantages are desired.

BRIEF SUMMARY

It is an object of an example embodiment of the present invention to provide a system, which effectively disables at least one communication functionality of a mobile phone before operating a vehicle. Accordingly, an example embodiment of the present invention is a dual-mode vehicle mobile phone disabler installed in a vehicle. The disabler enables a vehicle ignition system upon confirming that the mobile phone is not in use and at least one communication functionality except for emergency functionality is self-disabled by the mobile phone.

It is another object of another example embodiment of the present invention to provide a system, which effectively maintains disabled at least one communication functionality of a mobile phone during operation of a vehicle. Accordingly, an example embodiment of the present invention is a dual-mode vehicle mobile phone disabler installed in the vehicle. The disabler maintains disabled at least one communication functionality of the mobile phone during operation of the vehicle by periodically sending a continue disable signal to the mobile phone. Upon receipt of the continue disable signal, the mobile phone remains disabled except for emergency use until the vehicle is turned off and then the disabler ceases to transmit the continue disable signal to the mobile phone. In response, the mobile phone self-enables the least one disabled communication functionality.

An example embodiment of the present invention is a system for effectively preventing operation of a land vehicle having an interior when at least one communication functionality of a mobile phone is in use within the interior. The system includes a dual-mode mobile phone disabler and a power source. The dual-mode mobile phone disabler includes a processor powered by the power source and an antenna operably connected to the processor. In a first mode, prior to the vehicle being turned on, the processor, via the antenna, searches for and detects a communication signal from the mobile phone within the interior of the vehicle when the at least one communication functionality of the mobile phone is in use. In response to the detected communication signal, the processor prevents the vehicle from being turned on until the processor, via the antenna, detects no use of the at least one communication functionality of the mobile phone. The at least one communication functionality includes communication with a cell site. The communication signal is indicative of use of the at least one communication functionality. In a second mode, after the vehicle has been turned on, the processor, via the antenna, periodically communicates with the mobile phone within the interior of the vehicle to keep disabled the at least one communication functionality of the mobile phone. Upon the vehicle being turned off, the antenna ceases to communicate.

Another example embodiment of the present invention is a dual-mode land vehicle mobile phone disabler for use within an interior of a land vehicle having an ignition switch with a first position and a second position. The disabler includes an antenna and a processor operably connected to the antenna. When the ignition switch is set to the first position, the processor via the antenna searches for a communication link between a mobile phone within the interior and a cell site. The disabler also includes a means for immediately disabling operation of the ignition switch when the communication link is detected. The disabler further includes a means for continuously sending a disable signal to the mobile phone within the interior when the ignition switch is set to the first position and ceasing the sending of the disable signal when the ignition switch is set to the second position. The disable signal prevents the mobile phone within the interior from establishing the link with the site.

Yet another example embodiment of the present invention is a method for effectively preventing operation of a land vehicle having an interior when a mobile phone within the interior is in communication with a cell site. The method includes prior to the vehicle being turned on, searching for a communication link between the phone within the interior and the cell site. The method also includes detecting the link and preventing the vehicle from being turned on until the link is severed. The method further includes allowing the vehicle to be turned on when the link is severed and periodically communicating with the phone within the interior to prevent the phone within the interior from establishing the link with the site. The method even further includes ceasing communicating with the phone within the interior when the vehicle is turned off.

To the accomplishment of at least one of the above and related objects, the present invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

Objects, features and advantages of the present invention will become apparent to a skilled artisan in view of the following detailed description taken in combination with the attached drawings. In the drawings, like elements are depicted by like reference numerals. The drawings are briefly described as follows.

DETAILED DESCRIPTION OF THE PREFERRED EMBODIMENTS

The present invention now will be described more fully hereinafter with reference to the accompanying drawings, which show various embodiments. However, the present invention may be embodied in many different forms and should not be construed as limited to the embodiments set forth herein. Rather, these embodiments are provided so that the present disclosure is thorough, complete and fully conveys the scope of the invention to those skilled in the art.

Figure 1:
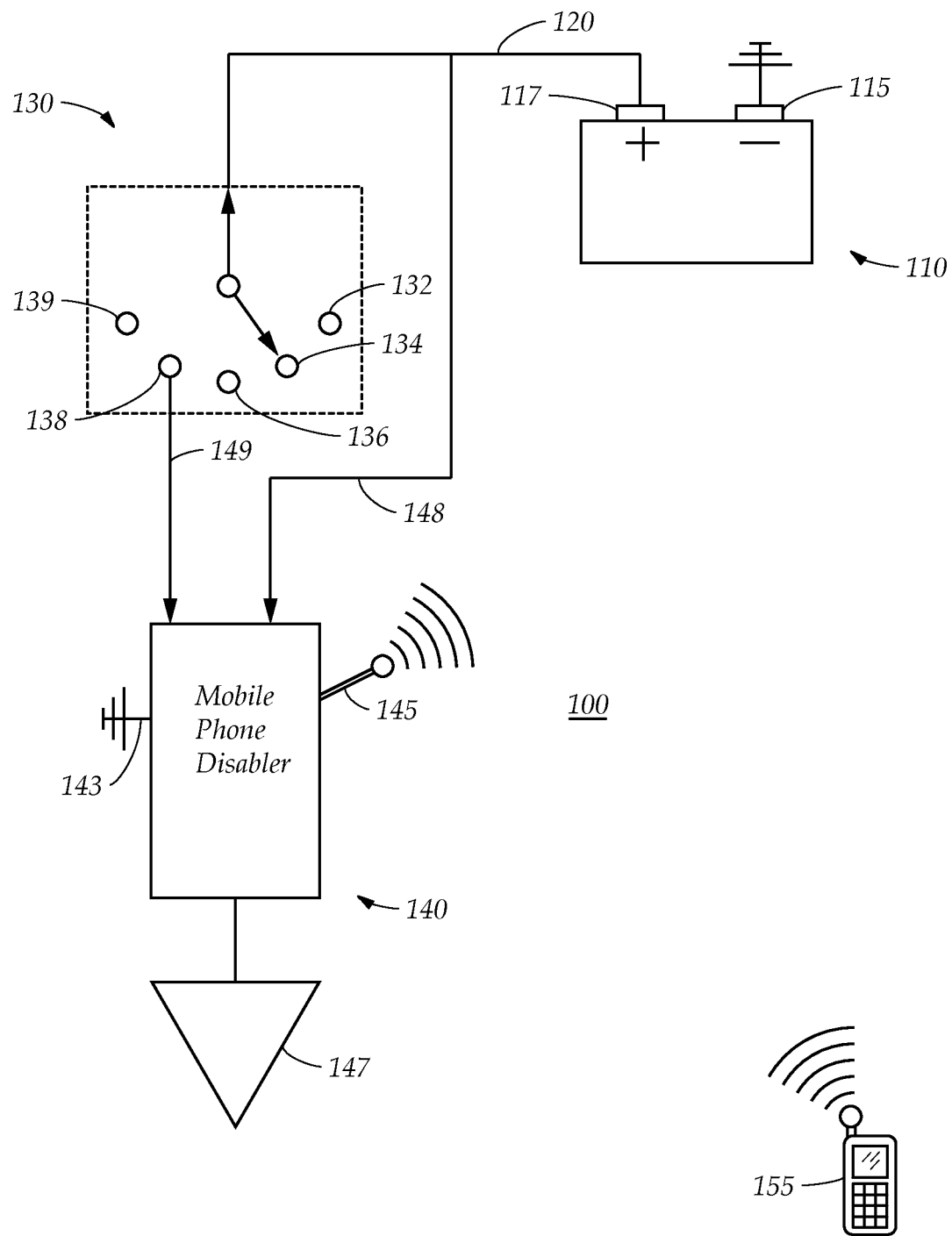
FIG. 1 is a schematic system diagram of an example embodiment of a dual-mode automotive mobile phone disabler system according to the present invention.

FIG. 1 is a schematic system diagram of an example embodiment of a dual-mode automotive mobile phone disabler system according to the present invention. An automobile includes a circuit 100. The automobile is operated by an operator.

Circuit 100 includes an automobile battery 110, an automobile ignition switch 130, a mobile phone disabler 140 and an automobile ignition system 147. A mobile phone 155 is within operational proximity of mobile phone disabler 140. Mobile phone 155 can include a chip which communicates with mobile phone disabler 140 in order to determine if at least one communication functionality of mobile phone 155 is currently being used.

Battery 110 includes a negative terminal 115 and a positive terminal 117. Although battery 110 has a voltage of twelve volts, battery 110 can have other voltages. A connection 120 connects positive terminal 117 and ignition switch 130.

Ignition switch 130 is actuated by the operator. Ignition switch 130 has five settings: an accessory powering setting 132, an ignition lock setting 134, an off setting 136, a run setting 138 and a start setting 139.

Accessory powering setting 132 switches on power to many auto accessories, such as radio or power windows.

Ignition lock setting 134 locks ignition switch 130.

Off setting 136 keeps ignition switch 130 off.

Run setting 138 keeps an automobile engine running after the automobile is started.

Start setting 139 powers an electric starter to start the automobile's engine.

A connection 148 connects mobile phone disabler 140 to connection 120. Mobile phone disabler 140 continuously receives power via connection 148.

A connection 149 connects ignition switch 130 at setting 138 to mobile phone disabler 140. Alternatively, connection 149 connects ignition switch 130 at other settings, such as 132, 134, 136 or 139.

Mobile phone disabler 140 is connected to automobile ignition system 147 and an automobile body/chassis ground 143. Mobile phone disabler 140 includes an antenna 145, which actively listens for signals emitted from mobile phone 155.

In an example mode of operation, within operational proximity of mobile phone disabler 140, mobile phone 155 is not in use and emits a signal, such as a connection to a cell site signal. In a first mode, via antenna 145, mobile phone disabler 140 detects the signal, determines that mobile phone 155 is not currently used for a phone call, communicates with mobile phone 155 and disables at least one communication functionality of mobile phone 155, such as making or receiving phone calls, emails, Internet browsing or text messaging. However, emergency communications are not disabled, such as making a phone call to emergency response service (911). Upon disabling of a communication functionality, mobile phone disabler 140 allows the operator to start the automobile via automobile ignition system 147.

In a second mode, if mobile phone disabler 140 determines that mobile phone 155 is in use, such as during a phone call, mobile phone 155 is not automatically disabled by mobile phone disabler 140. Rather, mobile phone disabler 140 instead prevents the operator from starting the automobile by disabling automobile ignition system 147 during the phone call. Via antenna 145, mobile phone disabler 140 periodically scans the signals emitted from mobile phone 155 to determine when the phone call ends. When mobile phone disabler 140 determines that the phone call ended, mobile phone disabler 140 communicates with mobile phone 155, disables at least one communication functionality of mobile phone 155 and enables the operator to start the automobile via automobile ignition system 147. However, emergency communications are not disabled, such as making a phone call to emergency response service (911).

In another example embodiment, mobile phone disabler 140 disables at least one gaming or entertainment functionality of mobile phone 155, such as solitaire or playing a video file.

In yet another example embodiment, at least one communication functionality of the mobile phone includes responsive/answering communications, such as phone calls/texting/emails between friends or organizations, thereby excluding communications associated with a global positioning system (GPS). Thus, mobile phone disabler 140 only monitors cell site communications, such as phone calls, texting, Internet browsing or emailing.

In yet even another example embodiment, at least one communication functionality of the mobile phone includes direct inter mobile phone communications between a plurality of mobile phones within the vehicle.

Figure 2:
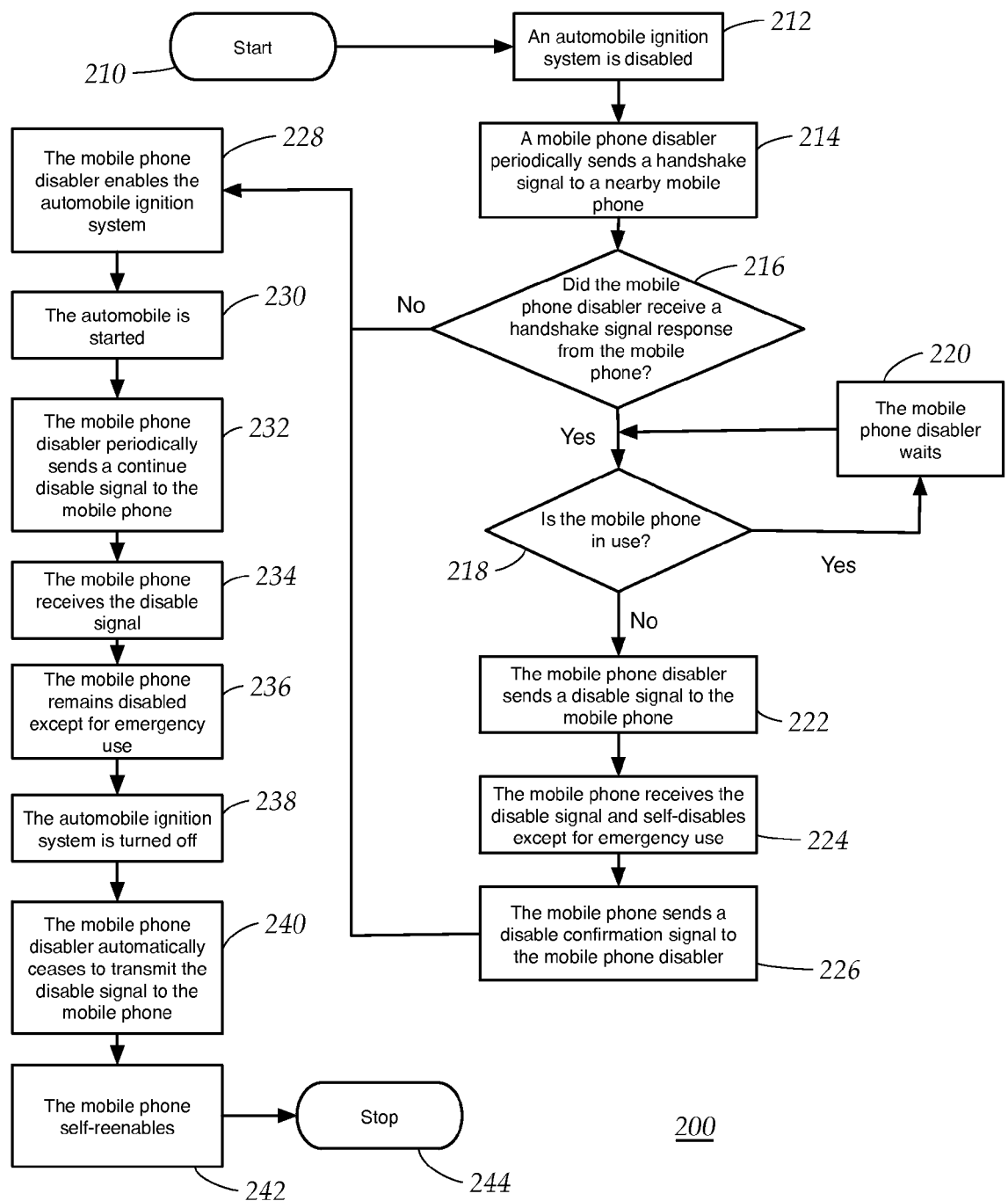
FIG. 2 is a flowchart of an example embodiment of a dual-mode process of a dual-mode automotive mobile phone disabler according to the present invention.

FIG. 2 is a flowchart of an example embodiment of a dual-mode process of a dual-mode automotive mobile phone disabler according to the present invention. A process 200 includes blocks 210-244.

In block 210, process 200 starts.

In block 212, an automobile ignition system is disabled, such as when an automobile is parked.

In block 214, a mobile phone disabler periodically sends a handshake signal to a nearby mobile phone. The sending is performed via an antenna. Periodically includes any time period, such as every five seconds. The mobile phone can include a chip for communication with the mobile phone disabler.

In block 216, the mobile phone disabler decides whether the mobile phone disabler has received a handshake signal response from the mobile phone. If yes, then process 200 continues to block 218. If no, then process 200 continues to block 228.

In block 218, the mobile phone disabler decides whether the mobile phone is in use. The decision can be made if the mobile phone sends a signal to the mobile phone disabler and the signal indicates that the mobile phone is currently in use, such as for sending and receiving voice data for a phone call.

In block 220, the mobile phone disabler waits for a period of time, such as five seconds. Then, process 200 continues to block 218.

In block 222, the mobile phone disabler sends a disable signal to the mobile phone.

In block 224, the mobile phone receives the disable signal and self-disables except for emergency use. The disabling includes disabling at least one communication function, such as making or placing a phone call, texting, emailing or Internet browsing. The emergency use includes a enabling communication to an emergency response entity, such as police. Alternatively, the disabling includes disabling at least one gaming or entertainment functionality of the mobile phone, such as solitaire or playing a video file.

In block 226, the mobile phone sends a disable confirmation signal to the mobile phone disabler.

In block 228, upon receipt of the disable confirmation signal, the mobile phone disabler enables the automobile ignition system.

In block 230, the automobile is started by an operator or remotely.

In block 232, the mobile phone disabler periodically sends a continue disable signal to the mobile phone in order to maintain at least one communication function of the mobile phone disabled during the operation of the automobile. Periodically includes any time period, such as every fifteen seconds.

In block 234, the mobile phone receives the continue disable signal.

In block 236, in response to the receipt of the continue disable signal, the mobile phone remains disabled except for emergency use, such as police.

In block 238, the automobile ignition system is turned off, such as during parking of the automobile.

In block 240, the mobile phone disabler automatically ceases to transmit the disable signal to the mobile phone.

In block 242, the mobile phone self-reenables. The enabling includes enabling at least one communication function, such as making or placing a phone call, texting, emailing or Internet browsing. Alternatively, the enabling includes enabling at least one gaming or entertainment functionality of the mobile phone, such as solitaire or playing a video file.

Figure 3:
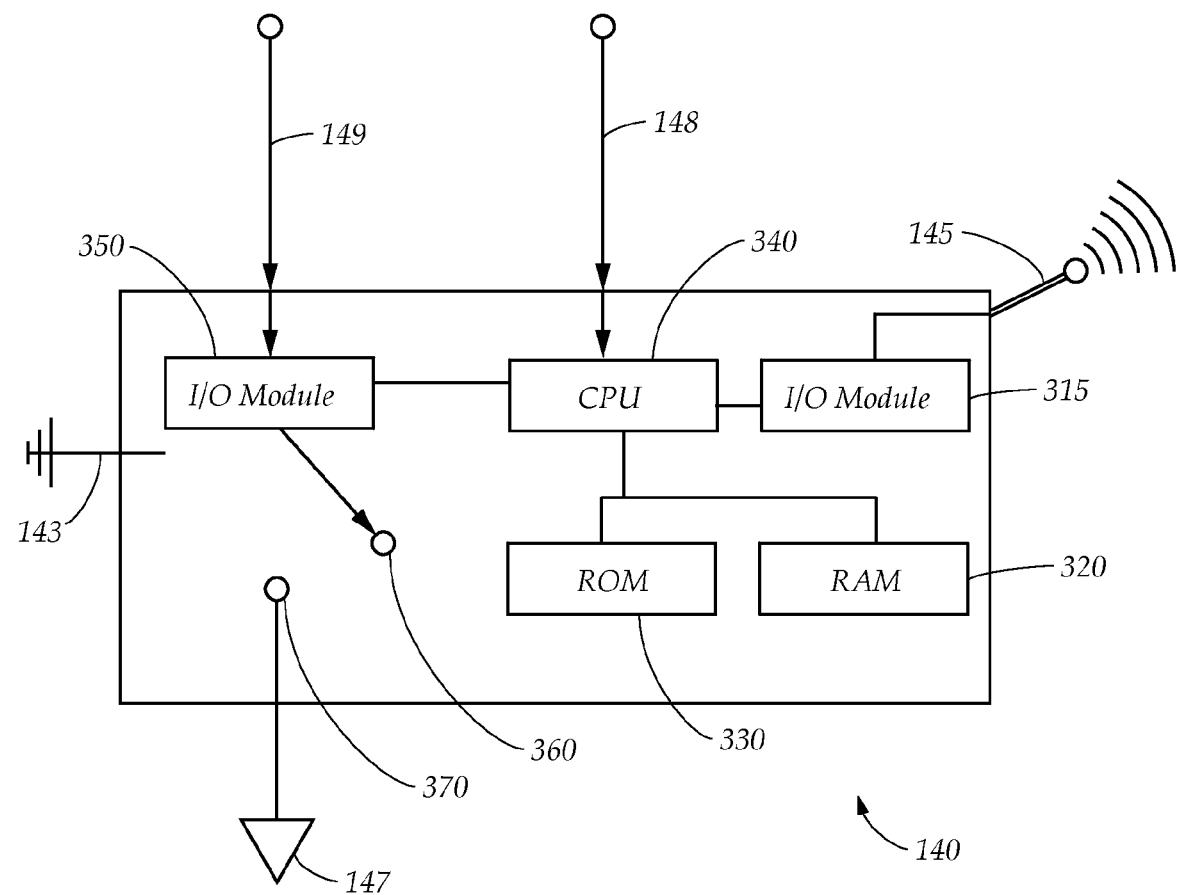
FIG. 3 is a schematic diagram of an example embodiment of a dual-mode automotive mobile phone disabler according to the present invention.

FIG. 3 is a schematic diagram of an example embodiment of a dual-mode automotive mobile phone disabler according to the present invention. Some elements of FIG. 3 are described above with respect to FIG. 1. Thus, same reference characters identify same or like components described above and any repetitive detailed description thereof will hereinafter be omitted or simplified in order to avoid complication.

Mobile phone disabler 140 includes a central processing unit (CPU) 340 connected to connection 148, input/output (IO) modules 315 and 350, read-only memory (ROM) 330 and random-access memory (RAM) 320. Via connection 148, CPU 340 is powered by battery 110.

ROM 330 stores instructions for execution by CPU 340.

RAM 320 stores instructions for communication with mobile phone 155.

IO module 315 is connected to antenna 145, which listens for mobile phone 155, sends a handshake signal to mobile phone 155, receives a handshake response signal from mobile phone 155, sends a disable signal to mobile phone 155 and sends a continue disable signal to mobile phone 155.

IO module 350 has two settings: a first setting 360 and a second setting 370. In first setting 360, IO module 350 does not facilitate activation of automobile ignition system 147. In second setting 360, IO module 350 facilitates activation of automobile ignition system 147, thus allowing the automobile to be started.

Figure 4:
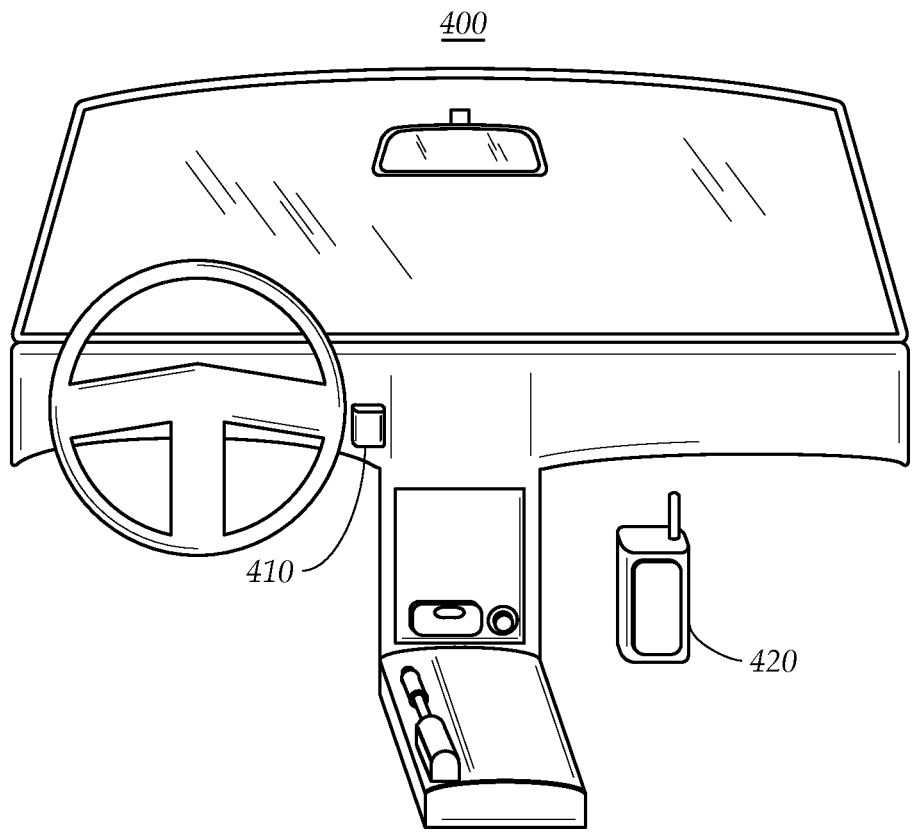
FIG. 4 is a view of an example embodiment of a dual-mode automotive mobile phone disabler installed in an automobile according to the present invention.

FIG. 4 is a view of an example embodiment of a dual-mode automotive mobile phone disabler installed in an automobile according to the present invention.

A front interior of an automobile is shown. A mobile phone disabler 410 is installed near a kick panel. A mobile phone 420 is near mobile phone disabler 410, which continuously sends a continue disable signal to maintain at least one communication functionality of mobile phone 420 disabled until ignition is turned off.

Although the foregoing description is directed toward personal automobiles, other types of vehicles can also be used. Some example of such vehicles include taxis, vans, trucks, buses, trains or boats.

Further, although the foregoing description is directed to internal combustion propulsion system, other types of propulsion systems can also be used. Some examples of such systems include electricity, water, hydrogen or wind based.

In conclusion, herein is presented a dual-mode automotive mobile phone disabler. Embodiments of the present invention are illustrated by example in the drawing figures and throughout the written description. It should be understood that numerous variations are possible, while adhering to the inventive concept without departing from the broader spirit and scope of the invention as set forth in the claims that follow. Such variations are contemplated as being a part of the present invention.

What is claimed is:

1. A system for effectively preventing operation of a land vehicle having an interior when at least one communication functionality of a mobile phone is in use within the interior, the system comprising:

a power source;

a dual-mode mobile phone disabler including a processor powered by the power source, an antenna operably connected to the processor, wherein in a first mode, prior to the vehicle being turned on, the processor, via the antenna, searches for and detects a communication signal from the mobile phone within the interior of the vehicle when the at least one communication functionality of the mobile phone is in use and in response to the detected communication signal, the processor prevents the vehicle from being turned on until the processor, via the antenna, detects no use of the at least one communication functionality of the mobile phone, the at least one communication functionality includes communication with a cell site, the communication signal is indicative of use of the at least one communication functionality, and wherein in a second mode, after the vehicle has been turned on, the processor, via the antenna, periodically communicates with the mobile phone within the interior of the vehicle to keep disabled the at least one communication functionality of the mobile phone and upon the vehicle being turned off, the antenna ceases to communicate, the disabler entering the second mode upon completion of the first mode and the first mode upon completion of the second mode.

2. The system of claim 1, wherein the at least one communication functionality excludes communication with an emergency response entity via the cell site and a global positioning satellite.

3. The system of claim 1, wherein in the first mode the processor permits the vehicle to be turned on when the mobile phone via the at least one communication functionality is in communication with an emergency response entity via the cell site and in the second mode the antenna ceases to communicate when the mobile phone via the at least one communication functionality attempts to communicate with the emergency response entity via the cell site.

4. The system of claim 3, wherein the power source is a battery, the at least one communication functionality includes direct communication with another mobile phone within the interior.

5. The system of claim 4, wherein the battery is attached to the vehicle, the at least one communication functionality excludes communication with a global positioning satellite.

6. The system of claim 5, further comprising an ignition switch and a vehicle ignition system, the switch activates the ignition system, wherein the mobile phone disabler is operably connected to the ignition switch and the ignition system, in the first mode the processor prevents the vehicle from being turned on by deactivating the ignition system until the processor via the antenna detects no use of the at least one communication functionality of the mobile phone.

7. A dual-mode land vehicle mobile phone disabler for use within an interior of a land vehicle having an ignition switch with a first position and a second position, the disabler comprising:
an antenna;
a processor operably connected to the antenna, when the ignition switch is set to the first position, the processor, via the antenna, searches for a communication link between a mobile phone within the interior and a cell site;
a means for immediately disabling operation of the ignition switch when the communication link is detected; and
a means for continuously sending a disable signal via the antenna to the mobile phone within the interior during a first mode when the ignition switch is set to the first position and ceasing the sending of the disable signal during a second mode when the ignition switch is set to the second position, the disable signal prevents the mobile phone within the interior from establishing the link with the site, the means entering the second mode upon completion of the first mode and the first mode upon completion of the second mode.

8. The disabler of claim 7, wherein the link excludes communication with a global positioning satellite and an emergency response entity via the cell site.

9. The disabler of claim 8, further comprising a power source powering the processor, the means for immediately disabling operation of the ignition switch and the means for continuously sending a disable signal.

10. The disabler of claim 9, wherein the power source is a battery, the means for immediately disabling operation of the ignition switch disables the switch when a direct communication link between the mobile phone within the interior and another mobile phone within the interior is detected.

11. The disabler of claim 10, wherein the battery is attached to the vehicle, the first position is an on position and the second position is an off position.

12. A method for effectively preventing operation of a land vehicle having an interior when a mobile phone within the interior is in communication with a cell site, the method comprising:
prior to the vehicle being turned on, during a first mode of a dual mode phone disabler, searching, via the phone disabler, for a communication link between the phone within the interior and the cell site;
detecting, during the first mode, via the disabler, the link;
preventing, during the first mode, via the disabler, the vehicle from being turned on until the link is severed;
allowing, via the disabler, the vehicle to be turned on when the link is severed;
periodically communicating, during a second mode of the disabler, with the phone within the interior to prevent the phone within the interior from establishing the link with the site; and
ceasing, during the second mode, via the disabler, communicating with the phone within the interior when the vehicle is turned off, the disabler entering the second mode upon completion of the first mode and the first mode upon completion of the second mode.

13. The method of claim 12, wherein the link excludes communication with an emergency response entity via the site and a global positioning satellite.

14. The method of claim 13, further comprising searching for a direct connection link between the mobile phone within the interior and another mobile phone within the interior, preventing the vehicle from being turned on until the direct connection link is severed.

15. The method of claim 14, wherein the vehicle includes an ignition switch and a vehicle ignition system, the switch activates the ignition system, wherein the mobile phone disabler is operably connected to the ignition switch and the ignition system, in the first mode the processor prevents the vehicle from being turned on by deactivating the ignition system until the processor via the antenna detects no use of the at least one communication functionality of the mobile phone.

* * * * *